W. Wilber,
Oil Press.
№ 18,367.   Patented Oct. 6, 1857.
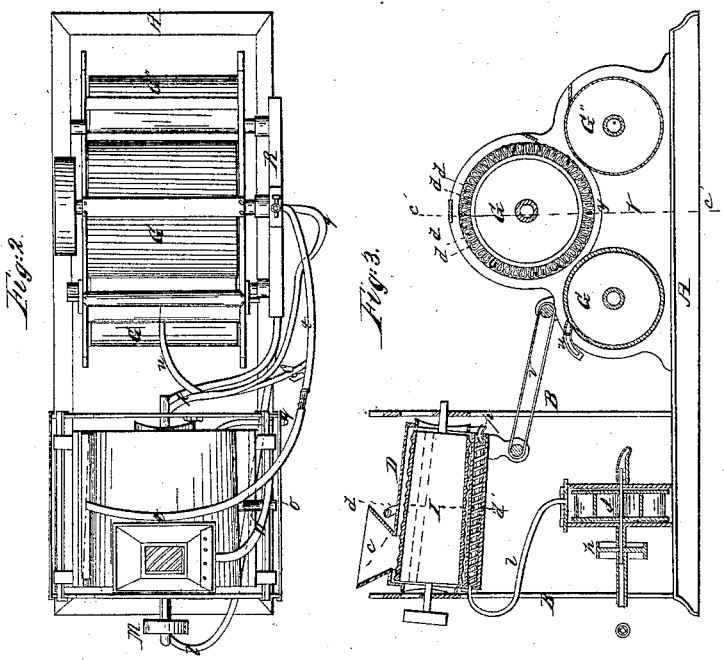
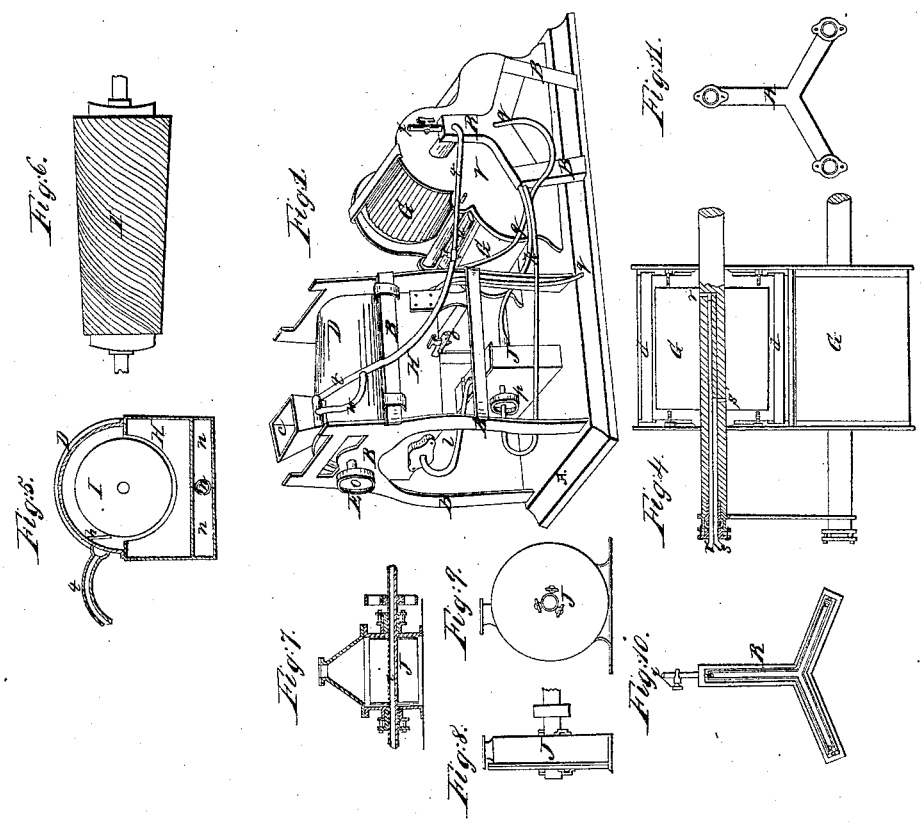

UNITED STATES PATENT OFFICE.

WILLIAM WILBER, OF NEW YORK, N. Y.

OIL-PRESSING MACHINERY.

Specification of Letters Patent No. 18,367, dated October 6, 1857.

*To all whom it may concern:*

Be it known that I, WILLIAM WILBER, formerly of New Orleans, Louisiana, but now of the city, county, and State of New York, have invented certain Improvements in Machinery for Extracting Oils from Oleaginous Seeds and other Oleaginous Substances Which Require to be Treated with Dry Heat; and I do hereby declare that the following specification, taken in connection with the accompanying sheet of drawings, is a full and complete description of the same.

Figure 1, is a perspective view of my improved apparatus. Fig. 2, is a plan. Fig. 3, is a longitudinal vertical section through the middle of the apparatus. Fig. 4, is a transverse section of the pressing rollers on an enlarged scale. Fig. 5, is a transverse section of tempering mill. Fig. 6, is a side view of the conical roller of the tempering mill. Fig. 7, is a longitudinal section of the fan. Fig. 8, is an end, and Fig. 9, a side view of the fan with its journals working on friction rollers. Fig. 10, is a section, and Fig. 11, a side view of the double air chamber.

The same part is indicated in all the figures by the same letter of reference.

The nature of my invention consists in a new construction of pressing rollers, for extracting oil from the pulp, and the arrangement of a system of chambers and tubes, in connection with a fan or other blowing or exhausting apparatus to the circulation of hot air through various parts of the machinery, and its direct application to the seeds and pulp.

In the accompanying drawings, A, A, is the bed plate of the machine, and B, B, the framing. The framing supports a main shaft and pulleys, which being driven from any suitable prime mover, impart motion to the crushing mill, fan, and pressure rollers by means of belts or gearing. This shaft, with its pulleys, is not shown in the drawings, as the mode of driving forms no part of my invention, and is not necessary to be represented in order to a complete understanding of the machine.

H is the bed of the crushing and tempering machine. It is made of granite, and its form is clearly shown by the section Fig. 5.

I, is the runner of the tempering machine, and is also made of granite, its surface being worked into spiral grooves, as seen in Fig. 6. I make these parts of granite or other suitable stone, because, when saturated with oil, the ground seeds will not adhere to that substance, whereas they stick to a cast iron surface. The tempering machine is furnished with a cover D of thin metal, and a hopper C, from which the seeds are fed. On the inside of the cover is a scraper *h*, which keeps the runner clean. The runner is driven by the pulley E by a belt from the main shaft. Below the bed H of the runner is a steam chamber *n, n*, connected by a pipe *o*, with the boiler. Through this chamber runs the spiral coil of pipe *m*. A pipe *p* carries off the water of condensation from this chamber. The object of this part of the apparatus is to impart heat to the air which is circulated through the machine in the manner hereafter to be described.

T, is a fan with hollow journals, and with curved vanes or blades. It is driven by the pulley P, and when in motion draws air in through both journals, and expels it at the periphery of the vanes. Two pipes *k* connect the journals of the fan with the double air chamber R, and a third pipe *l*, connects the periphery of the fan with the coil *m*, in the steam chamber *n*. Another pipe *q*, connects the other end of said coil with the center of the air chamber R. Another pipe *t*, with its branches, connects the air chamber R with the hopper C, the tempering mill H, and the underside of the endless belt *v'*, where the pulp passes in between the rollers. The tri-branched air chamber R is made with two separate compartments, (see Fig. 10,) one to receive the hot air through pipe *q* and distribute it to the rollers, &c., and the other to receive the air that has parted with its heat, and return it to the fan to be again driven through the coil, heated and circulated. The ends of the branches of this chamber are fitted over the journals of the pressure rollers G, G′, G″ by stuffing boxes which make a tight joint, and permit free motion to the rollers. The hot air compartment of the chamber is connected by a tube *r* with the farther end of the rollers G, &c. (See Fig. 4.) The cold air compartment is connected with the interior of said rollers by the shorter tube *s*.

*x* is the cold air supply pipe, and admits the external air to the cold air compartment of chamber R.

The pressure rollers G, G′, G″, are formed by placing upon a hollow internal cylinder, staves of iron of the form shown in transverse section at *d* in Fig. 3, and covering the whole with thick hair cloth closely fitted to the surface of the staves. Several of these staves may be made in one casting, and the compound stave thus formed is applied to the surface of the internal cylinder, and held there by end pieces or plates. The internal cylinder is bulged in the middle and the staves are increased in thickness at the ends, not only to compensate for this bulge, but so much as to make the roller slightly hollow in the middle. The staves have numerous holes through them for the passage of oil to the interior cylinder. The oil also passes in between the joints of the staves. The staves project a short distance beyond the internal cylinder, and are held in place by end plates which at their junction with the cylinder-head and staves, form a channel for the passage of oil to a receiver placed below to contain it. In the drawings only one roller is represented as made of staves as above described, but one or more may be used as the case may require.

The operation of the machine is as follows: The seeds to be crushed are placed in the hopper C, whence they are fed into the crushing and tempering mill. In the hopper they receive a blast of hot air from the pipe *w*, and as soon as they pass into the tempering mill, they are again subjected to the action of the hot air from the pipe *t*. After being crushed they pass, in the state of pulp, on to the endless belt *v*, which conducts its load between the rollers G, G'. Here the pulp is again heated by a hot blast from the long narrow orifice at the end of the branch pipe *u*. The rollers are themselves kept at a high temperature by the hot air circulating through them, and contribute to heat the pulp passing between them. After having the oil expressed from it between rollers G and G', the pulp passes over the bridge *y* and is subjected to a second pressure between G and G'', and then passes out on to the delivery board, in a fit state to be cut up for use. The oil from the pulp, passing through the hair cloth, and the staves on the inner cylinder runs to the ends of said cylinder and falls into the channel in the end plates and passes thence into a reservoir prepared to receive it.

The heating apparatus operates as follows: Steam passes from the boiler through pipe *o*, into the steam chamber *n*, *n*, through which the coil *m* passes. It parts with its heat to the coil, and becomes condensed, and the water of condensation is drawn off through the pipe *p*. The fan J being put in operation draws cold air from the cold air compartment of air chamber R and drives it through pipe *l* and coil *m*. Here the air becomes heated, and passes through pipe *q* into the hot air compartment of chamber R, whence it is distributed as follows. A portion of it goes by pipe *r* to the farther ends of the rollers and after heating them returns by pipe *s* to the cold air compartment. Another portion is driven through pipe *t* and supplies by one branch pipe *u*, the blast between the rollers, and by another, *w*, that in the hopper C, pipe *t*, itself, supplying the crushing and tempering mill. The air lost in these operations is supplied by pipe *x* communicating with the cold air compartment of chamber R.

What I claim is—

The arrangement herein described of a system of chambers and tubes in connection with a fan or other proper blowing or exhausting apparatus, for the purpose of circulating hot air through various parts of the machine and applying it directly to the seeds and pulp, substantially in the manner hereinbefore specified.

The above specification signed and witnessed this nineteenth day of March 1857.

WILLIAM WILBER.

Witnesses:
E. G. HANDY,
CHAS. F. STANSBURY.